2,980,578
METHOD OF COMBATING PLANT-ATTACKING FUNGUS

Walter W. Abramitis, Downers Grove, and Edward A. Tehle, Jr., Brookfield, Ill., assignors to Armour & Company of Delaware, Chicago, Ill., a corporation of Delaware No Drawing. Filed June 24, 1955, Ser. No. 517,908

3 Claims. (Cl. 167—22)

This invention relates to compositions and to a method involving the use of such compositions for combating plant-attacking fungus.

Plant diseases caused by fungi are a serious problem. To mention only a few examples, apple bitter rot, peach brown rot, tomato early blight and wheat and bean rusts are fungus-created plant diseases which are of considerable concern.

Fungus attacks leaves, stems, and roots of plants and, in general, the exterior surfaces of plants. In treating the fungus-caused plant diseases or in treating plants to prevent such diseases, it is necessary to apply the fungicidal composition directly on the plants, and this presents a problem because many, if not most, fungicides are toxic to plants. The phytotoxicity of many compositions which would otherwise be highly effective fungicides disqualifies them for use in combating plant-attacking fungus. The problem then in this field is to find active fungicides or fungicidal compositions which are non-phytotoxic when applied to plants, at least at the concentration required for effective control of plant fungi.

It is, therefore, a general object of this invention to provide novel compositions and a novel method for combating plant-attacking fungus.

It is a further object of this invention to provide compositions containing compounds highly active as fungicides against plant-attacking fungus, which are at the same time of very low phytotoxicity and are substantially non-phytotoxic at the concentrations required for controlling plant-attacking fungus.

Further objects and advantages of the present invention will become apparent as the specification proceeds.

This invention is based in part on the discovery that certain isothiouronium compounds are highly active as fungicides against plant-attacking fungi while at the same time being relatively non-phytotoxic when applied to growing plants. The class of compounds falling within the scope of this invention can be identified as compounds having the following general formula:

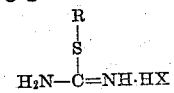

wherein R is an aliphatic hydrocarbon radical having from 8 to 18 carbon atoms and X is either chlorine or bromine. Examples of the aliphatic hydrocarbon radicals include n-alkyl radicals such as octyl, decyl, dodecyl, tetradecyl, pentadecyl, hexadecyl, heptadecyl, and octadecyl; and n-alkenyl radicals such as octadecenyl, octadecadienyl, and octadecatrienyl. These n-aliphatic hydrocarbon radicals can also be employed as mixtures, as for example, as derived from animal and vegetable oil fatty acids like coconut oil, tallow, soybean oil, cottonseed oil, etc. In the preferred compounds the R is a mixture of radicals as derived from coconut oil acids and X is chlorine. This compound can be referred to as coco isothiouronium chloride.

In general, the S-aliphatic isothiouronium halides are produced by reaching equimolar quantities of thiourea and aliphatic halides. As an illustration, lauryl-isothiouronium bromide was produced by refluxing for about 24 hours 3 gram mols of laurylbromide in admixture with 3 gram mols of thiourea and 850 ml. of 3A alcohol. The warm solution was filtered and cooled to room temperature where crystallization of the laurylisothiouronium bromide started. The mixture was filtered, the filtrate concentrated and approximately 500 ml. of ethyl acetate added, the solution being placed in a cold room. Another crop of crystals was obtained and the two crops were recrystallized from ethyl acetate yielding approximately 800 grams of pure laurylisothiouronium bromide.

The S-aliphatic isothiouronium halides described above can be used as the active ingredient in compositions for combating plant diseases caused by fungus. Such compositions can take the form of emulsions, solutions, powders, etc. The isothiouronium compounds are not applied in full strength, but instead are combined with a carrier so that a fungistatic but non-phytotoxic concentration of the isothiouronium halide can be applied to the growing plants. It has been found there is a considerable margin of safety between active and phytotoxic concentrations. For example, with most of the compounds falling within the scope of this invention, an effective fungistatic or fungitoxic action is obtained at concentrations ranging from 16 to 500 parts per million, whereas no phytotoxicity is exhibited in concentrations up to 400–1000 parts per million. This permits fungicidal compositions of this invention to be sprayed or dusted on plants without danger of phytotoxicity due to over concentrations.

This invention is further illustrated and its value shown by the following specific examples:

Example I

The fungicidal activity of the S-aliphatic isothiouronium halides was tested with spores of *Alternaria oleracea*, *Glomerella cingulata*, *Monilinia fructicola*, and *Macrosporium sarcinaeforme*. These spores respectively cause tomato early blight, apple bitter rot, peach brown rot, and leaf spot. The slide spore germination method was employed, the results of the tests being tabulated below:

| Chemical Used | Fungus Used | Germ. of spores at conc. (p.p.m.) of — | | | |
|---|---|---|---|---|---|
| | | 100 | 10 | 1 | 0.1 |
| S-Octylisothiouronium Chloride | A.o. | 0 | 0 | 85.5 | 99.1 |
| | G.c. | 0 | 0 | 83.9 | 100 |
| | M.f. | 0 | 0 | 84.3 | 99 |
| | M.s. | 0 | 0 | 88.9 | 98 |
| S-"Coco"isothiouronium bromide | A.o. | 0 | 0 | 63.5 | 91.1 |
| | G.c. | 0 | 0 | 70.0 | 95.7 |
| | M.f. | 0 | 0 | 80.1 | 93.5 |
| | M.s. | 0 | 0 | 90.7 | 99.5 |
| S-"Coco"isothiouronium chloride | A.o. | 0 | 0 | 100 | |
| | G.c. | 0 | 0 | 0 | 11.9 |
| | M.f. | 0 | 0 | 98.6 | 100 |
| | M.s. | 0 | 92.7 | 99.6 | 100 |
| S-Tetradecylisothiouronium chloride | A.o. | 93.3 | 100 | 98.6 | 100 |
| | G.c. | 98.5 | 100 | 100 | 100 |
| | M.f. | 98.5 | 99.5 | 100 | 100 |
| | M.s. | 99.5 | 100 | 99.5 | 100 |
| S-"Tallow"isothiouronium chloride | A.o. | 93.7 | 100 | 100 | 100 |
| | G.c. | 96.6 | 99.5 | 100 | 99.5 |
| | M.f. | 92.3 | 99.5 | 100 | 100 |
| | M.s. | 37.0 | 90.8 | 100 | 100 |

| | | 1000 p.p.m. | 750 p.p.m. | 500 p.p.m. | 100 p.p.m. |
|---|---|---|---|---|---|
| Tetradecylisothiouronium chloride, percent germinated | A.o. | 0 | 0 | 0 | 82.7 |
| | | 0 | 0 | 0 | 79.8 |
| | G.c. | 0 | 0 | 0 | 82.5 |
| | | 0 | 0 | 0 | 88.3 |
| | M.f. | 0 | 0 | 0 | 65.4 |
| | | 0 | 0 | 0 | 58.7 |
| "Tallow"isothiouronium chloride, percent Germinated | A.o. | 0 | 0 | 20.2 | 97 |
| | | 0 | 0 | 30.8 | 92.3 |
| | G.c. | 0 | 0 | 0 | 0 |
| | | 0 | 0 | 0 | 0 |
| | M.f. | 0 | 0 | 39.4 | 87.5 |
| | | 0 | 0 | 36.5 | 95.2 |

The above data show that the highest order of fungicidal activity was exhibited by the octyl and "coco" isothiouronium compounds.

Example II

S-"coco" isothiouronium chloride was subjected to greenhouse inoculation tests for the control of certain diseases. In the test procedure the plants were given a known dosage of the compound applied as a spray, allowed to dry, then atomized with a given concentration of the spore inoculum, and immediately transferred into a high humidity chamber where they were held for 24 hours to allow for infection. They were then removed to the greenhouse to develop lesions. Lesion counts were made on 3 comparable leaves of each plant. The results are given below:

| Chemical | Disease | Percent Control at Concentration (p.p.m.) of— | | | | | | | |
|---|---|---|---|---|---|---|---|---|---|
| | | 400 | 200 | 80 | 40 | 16 | 8 | 3.2 | 0.65 |
| S-"Coco"isothiouronium chloride. | Tomato early blight | | 80 | | 84 | | 66 | | |
| | Tomato late blight | 100 | | 91 | | 76 | | | |
| | Snapdragon rust | 100 | | 100 | | 100 | | 61 | 43 |

This compound is particularly effective against rust disease. At 16 p.p.m. concentration the chemical gave 100% control. The best colloidal sulfur compound is only about 50% effective at this concentration against rust.

No plant injury was reported at the dosages used to control disease on tomato, bean, and snapdragon plants. Young green bean plants sprayed with a solution containing 1000 p.p.m. of "coco" isothiouronium bromide or "coco" isothiouronium bromide were not injured.

Example III (A) An emulsifiable concentrate consists of:
  50% active chemical
  5-10% non-ionic emulsifier such as the coco acid or rosin fatty acid esters of polyethylene glycols
  45-40% aromatic or aliphatic solvent such as xylene or acetone
  This is diluted with water to give 1-2 lbs. active ingredient per 100 gals. water for the final spray.

(B) A wettable powder which may be used in the form of a water spray consists of:
  50-75% active chemical
  5% non-ionic emulsifier such as the coco fatty acid or rosin fatty acid esters of polyethylene glycols
  45-20% diluent such as pyropholite, clays, celite, etc.
  One to two pounds of this powder is placed in 100 gallons of water and sprayed in this form.

(C) A dust composition consists of:
  50-75% active ingredient
  50-25% diluent such as pyropholite, clays, celite, etc.
  The average particle size should not be greater than 30 microns. Efficiency appears to increase with the fineness of the dust.

It will be understood that any of the isothiouronium compounds described as within the scope of the present invention can be used in the specific formulations of this example.

While in the foregoing specification this invention has been described in relation to certain specific embodiments thereof and details have been set forth for the purpose of illustration, it will be apparent to those skilled in the art that the invention is susceptible to other embodiments and many of the details set forth herein can be varied considerably without departing from the basic concepts of the invention.

We claim:

1. A method for combating plant fungus which comprises applying to growing plants a fungicidal non-phytotoxic concentration of a compound having the general formula

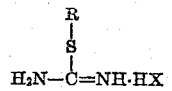

wherein R is an aliphatic hydrocarbon radical having from 8 to 18 carbon atoms and X is a member of the group consisting of chlorine and bromine.

2. A method in accordance with claim 1 wherein the compound employed is coco isthiouronium chloride.

3. A method in accordance with claim 1 wherein the compound employed is octylisothiouronium chloride.

References Cited in the file of this patent

UNITED STATES PATENTS

| 2,347,827 | Hunt | May 2, 1944 |
| 2,697,727 | Kaiser | Dec. 21, 1954 |
| 2,774,706 | Hackmann | Dec. 18, 1956 |